US008180973B1

(12) United States Patent
Armangau et al.

(10) Patent No.: US 8,180,973 B1
(45) Date of Patent: May 15, 2012

(54) SERVICING INTERRUPTS AND SCHEDULING CODE THREAD EXECUTION IN A MULTI-CPU NETWORK FILE SERVER

(75) Inventors: Philippe Armangau, Acton, MA (US); Jean-Pierre Bono, Westboro, MA (US); John Forecast, Newton Center, MA (US); Sorin Faibish, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 329 days.

(21) Appl. No.: 12/646,457

(22) Filed: Dec. 23, 2009

(51) Int. Cl.
*G06F 12/00* (2006.01)
(52) U.S. Cl. ........ 711/147; 711/158; 711/151; 711/152; 711/E12.001; 718/102; 709/225
(58) Field of Classification Search .................. 711/148, 711/151, 152, 158, E12.001, E12.032; 709/225; 718/102
See application file for complete search history.

(56) References Cited

U.S. PATENT DOCUMENTS

| | | | |
|---|---|---|---|
| 5,893,140 A | 4/1999 | Vahalia et al. | |
| 5,933,603 A | 8/1999 | Vahalia et al. | |
| 6,065,037 A | 5/2000 | Hitz et al. | |
| 6,813,522 B1 | 11/2004 | Schwarm et al. | |
| 7,028,218 B2 | 4/2006 | Schwarm et al. | |
| 7,162,666 B2 | 1/2007 | Bono | |
| 7,178,145 B2 * | 2/2007 | Bono | 718/100 |
| 7,739,379 B1 * | 6/2010 | Vahalia et al. | 709/225 |
| 7,908,656 B1 * | 3/2011 | Mu | 726/22 |
| 2002/0052914 A1 * | 5/2002 | Zalewski et al. | 709/203 |
| 2002/0116563 A1 * | 8/2002 | Lever | 710/260 |

OTHER PUBLICATIONS

Branstad, et al., "The Role of Trust in Protected Mail", IEEE Computer Society Symposium on Research in Security and Privacy, May 7-9, 1990, Oakland, California, USA, pp. 210-215.A*
Uresh Vahalia, Unix Internals: The New Frontiers, Chapter 9, pp. 261-289, 1996, Prentice Hall, Inc., Simon & Schuster, Upper Valley River, New Jersey 07458.
"Delivering on the Promise of Internet Streaming Media," v1.0, pp. 1-15, Oct. 2000, CacheFlow Inc., Sunnyvale, CA.
"Streaming Media Optimization with CacheFlow Internet Caching Appliances," pp. 1-15, Jun. 11, 2001, CacheFlow, Inc., Sunnyvale, CA.
P. Venkat Rangan and Harrick M. Vin, "Designing File Systems for Digital Video and Audio," pp. 81-94, 1991, Multimedia Laboratory, University of California, Dept. of Computer Science and Engineering, La Jolla, CA.
Huanxu Pan, Lek Heng Ngoh, and Aurel A, Lazar, "A Time-Scale Dependent Disk Scheduling Scheme for Multimedia-on-Demand Servers," pp. 572-579,1996, IEEE, New York, NY.

(Continued)

*Primary Examiner* — Pierre-Michel Bataille
(74) *Attorney, Agent, or Firm* — Richard Auchterlonie; Novak Druce & Quigg, LLP

(57) ABSTRACT

Interrupts and code threads are assigned in a particular way to the core CPUs of a network file server in order to reduce latency for processing client requests for file access. Threads of the network stack are incorporated into real time threads that are scheduled by a real-time scheduler and executed exclusively by a plurality of the core CPUs that are not interrupted by disk adapter interrupts so that the disk adapter interrupts do not interrupt execution of the network stack. Instances of a storage access driver are hard affinity threads, and soft affinity threads include a multitude of instances of a thread of the file system stack for file access request processing so that file access request processing for a multitude of concurrent file access requests is load balanced over the core CPUs.

20 Claims, 10 Drawing Sheets

OTHER PUBLICATIONS

K. K. Ramakrishnan et al., "Operating System Support for a Video-On-Demand File Service," ACM/Springer Journal on Multimedia Systems, 24 pages, vol. 3, Mar. 1995, Association for Computing Machinery, New York, NY.

Lev Vaitzblit, "The Design and Implementation of a High-Bandwidth File Service for Continuous Media," Nov. 4, 1991, 94 pages, Master's Thesis, Massachusetts Institute of Technology, Cambridge, MA.

David P. Anderson, Yoshitomo Osawa and Ramesh Govindan, "A File System for Continuous Media," ACM Transactions on Computer Systems, vol. 10, No. 4, pp. 311-337, Nov. 1992, Association for Computing Machinery, Inc., New York, NY.

Celerra File Server in the E-Infostructure, 2000, 12 pages, EMC Corporation, Hopkinton, MA.

Bill Nowicki, Network Working Group, RFC 1094, "NFS: Network File System Protocol Specification," Mar. 1989, 27 pages, Sun Microsystems, Inc., Santa Clara, CA.

Paul J. Leach and Dilip C. Naik, "A Common Internet File System," Dec. 19, 1997, 121 pages, Microsoft Corporation, Redmond, WA.

J. Satran et al., RFC 3720, "Internet Small Computer System Interface (iSCSI)," Network Working Group, Apr. 2004, 257 pages, The Internet Society, Reston, VA.

The OSI (Open System Interconnection) Model, printed Nov. 11, 2009, 7 pages, infocellar.com.

Berkeley sockets, Wikipedia, Nov. 21, 2009, 14 pages, Wikimedia Foundation, Inc., San Francisco, CA.

M. Morioka et al., Design and Evaluation of the High Performance Multi-Processor Server, VLSI in Computers and Processors, Cambridge, Mass., Oct. 10-12, 1994, pp. 66-69, IEEE Computer Society Press, Los Alamitos, CA.

Building Cutting-Edge Server Applications, White Paper, 2002, 10 pages, Intel Corporation, Santa Clara, CA.

Intel Core i7 Processor Extreme Edition, Product Brief, downloaded Nov. 20, 2009, 2 pages, Intel Corporation, Santa Clara, CA.

Intel Core 2 Extreme Quad-Core Mobile Processor and Intel Core 2 Quad Mobile Processor on 45-nm Process, Datasheet, Jan. 2009, 72 pages, Intel Corporation, Santa Clara, CA.

Improving Network Performance in Multi-Core Systems, White Paper, 2007, 4 pages, Intel Corporation, Santa Clara, CA.

Intel Pentium 4 and Intel Xeon Processor Optimization, Reference Manual, 2002, 35 pages, Intel Corporation, Santa Clara, CA.

Threading Services, web page, downloaded Jul. 13, 2002, 2 pages, intel.com, Intel Corporation, Santa Clara, CA.

Threading Tools, web page, downloaded Jul. 13, 2002, 6 pages, intel.com, Intel Corporation, Santa Clara, CA.

\* cited by examiner

SERVICING INTERRUPTS AND SCHEDULING CODE THREAD EXECUTION IN A MULTI-CPU NETWORK FILE SERVER

FIELD OF THE INVENTION

The present invention relates generally to a network file server having multiple core central processing units, and in particular to servicing of interrupts and scheduling of code thread execution by the core central processing units in the network file server.

BACKGROUND OF THE INVENTION

A network file server provides network clients, such as personal computers or workstations, with shared access to a file system in data storage. The network file server supports a network data transmission protocol, such as the Transmission Control Protocol (TCP) over the Internet Protocol (IP), for transmission of data packets between the network file server and the network clients. The network file server supports a file access protocol, such as the Network File System (NFS) protocol or the Common Internet File System (CIFS) protocol, for client access to a hierarchical file system of directories and regular data files in the data storage. The network file server maintains a file system cache memory of recently accessed files, and if data to be accessed is not found in the file system cache, then the network file server fetches the data the data storage. The network file server uses a storage access protocol, such as the Small Computer System Interface (SCSI) or Fibre-Channel (FC) protocol, for accessing data in the data storage.

A network file server typically includes a general purpose commodity digital computer and a disk storage array. The commodity general purpose digital computer is often loaded up with random access memory for the file system cache, and has a good number of network adapters and disk adapters for enhanced throughput between the client network and the disk storage array. The commodity general purpose digital computer is especially programmed to exploit the conventional multi-tasking and multi-processing capabilities of the commodity general purpose digital computer. These conventional multi-tasking and multi-processing capabilities include the pipelining of input/output data though network interface adapters, disk adapters, and a direct memory access input/output unit, and the use of multiple "core" central processing units (CPUs) for processing of the data in a shared random access memory.

Before the commercial availability of multi-CPU commodity general purpose digital computers, network file servers employed a multi-tasking real-time operating system for exploiting the multi-tasking capabilities of the commodity general-purpose computers. For example, as described in Vahalia et al. U.S. Pat. No. 5,933,603, incorporated herein by reference, a real-time scheduler was used in a video file server for scheduling isochronous tasks and also general purpose tasks programmed as code threads. The real-time tasks not only ensured isochronous delivery of the real-time video but also were used for "polling" device drivers and communication stacks. As further described in Vahalia U.S. Pat. No. 5,893,140, incorporated herein by reference, this real-time scheduler was also used in a network file server. The method of polling for pending work, as opposed to interrupt-driven processing, was said to contribute to system stability and alleviate most of the problems that arise during overloads. It also was said to provide isolation between multiple real-time tasks that have differing performance requirements.

The use of a multi-CPU general purpose commodity digital computer in a network file server introduced a problem of distributing the execution of real-time and general-purpose code threads among the multiple "core" CPUs. It was discovered that some code threads should be permanently assigned to a specific CPU, and other code threads should be assigned initially or temporarily to a specific CPU when execution of the code thread begins. In other words, each code thread should have either a "hard" or a "soft" affinity for a CPU. For example, as described in Bono U.S. Pat. No. 7,178,145, incorporated herein by reference, each processor has a respective hard affinity queue and soft affinity queue. For execution of a thread, a queue loader places an instance of the thread upon the hard or soft affinity queue of a selected processor. The selection may use an affinity attribute, processor attribute, accessor function, or a respective program of code threads for each processor. A thread instance on a processor's hard affinity queue is executed only by that processor. A thread instance on a processor's soft affinity queue is executed by that processor unless another processor has a soft affinity queue empty of thread instances ready for execution. Each processor alternates service priority between its hard and soft affinity queues.

SUMMARY OF THE INVENTION

Although real-time operating systems and thread managers for hard and soft affinity threads have been used for some time in network file servers, it has been discovered that a substantial performance improvement is possible by a particular assignment of interrupts and code threads to the core CPUs in a multi-CPU commodity general purpose digital computer of a network file server.

In accordance with one aspect, the invention provides a network file server including a data processor, a disk storage array storing data, network adapters for linking the data processor to a data network for exchange of data packets between the data processor and clients in the data network, and storage adapters linking the data processor to the disk storage array for exchange of data blocks between the data processor and the disk storage array. The data processor includes at least eight core central processing units (CPUs), and shared memory shared among the core CPUs and containing programs executable by the core CPUs. The programs executable by the core CPUs include a real-time scheduler for scheduling execution of real-time and general purpose threads, and a thread manager for managing execution of hard affinity threads and soft affinity threads of the general purpose threads. Each of the hard affinity threads is executed exclusively by a respective one of the core CPUs, and the thread manager distributes execution of the soft affinity threads among the core CPUs for load balancing. The programs executable by the core CPUs include a network adapter interrupt routine for responding to interrupts from the network adapters when the network adapters receive data packets from the data network, a network stack for transmission of data through the network adapters between the data processor and the data network in accordance with a network data transmission protocol, a file system stack for providing clients in the data network with access to the data storage array in accordance with a file system access protocol and for maintaining an in-core file system cache in the shared memory, a storage access driver for accessing the data storage array in accordance with a storage access protocol, and a disk adapter interrupt routine for responding to interrupts from the disk adapters when the disk adapters receive data blocks from the disk storage array. Threads of the network stack are incorporated into the real time threads that are scheduled by the real-time scheduler and executed exclusively by a plurality of the core CPUs that are not interrupted by the disk adapter interrupts so that the disk adapter interrupts do not interrupt execution of the network stack, instances of the storage access driver are hard affinity threads, and the soft affinity threads include a multitude of instances of a thread of the file system stack for file access request processing so that file access request processing for a multitude of concurrent file access requests is load balanced over the core CPUs.

In accordance with another aspect, the invention provides a network file server including a data processor, a disk storage array storing data, network adapters linking the data processor to a data network for exchange of data packets between the data processor and clients in the data network, and storage adapters linking the data processor to the disk storage array for exchange of data blocks between the data processor and the disk storage array. The data processor includes at least eight core central processing units (CPUs), and shared memory shared among the core CPUs and containing programs executed by the core CPUs. The programs executable by the core CPUs include a real-time scheduler scheduling execution of real-time and general purpose threads, and a thread manager managing execution of hard affinity threads and soft affinity threads of the general purpose threads. Each of the hard affinity threads is executed exclusively by a respective one of the core CPUs, and the thread manager distributes execution of the soft affinity threads among the core CPUs for load balancing. The programs executed by the core CPUs further include a network adapter interrupt routine responding to interrupts from the network adapters when the network adapters receive data packets from the data network, a network stack transmitting data through the network adapters between the data processor and the data network in accordance with a network data transmission protocol, a file system stack providing clients in the data network with access to the data storage array in accordance with a file system access protocol and maintaining an in-core file system cache in the shared memory, a storage access driver accessing the data storage array in accordance with a storage access protocol, and a disk adapter interrupt routine responding to interrupts from the disk adapters when the disk adapters receive data blocks from the disk storage array. Threads of the network stack are incorporated into the real time threads that are scheduled by the real-time scheduler and executed exclusively by a plurality of the core CPUs that are not interrupted by the disk adapter interrupts so that the disk adapter interrupts do not interrupt execution of the network stack, instances of the storage access driver are hard affinity threads, and the soft affinity threads include a multitude of instances of a thread of the file system stack for file access request processing so that file access request processing for a multitude of concurrent file access requests is load balanced over the core CPUs. All of the network adapter interrupts are mapped to a single one of the core CPUs so that the single one of the core CPUs is interrupted by each of the network adapter interrupts to execute the network adapter interrupt routine, and the single one of the core CPUs is not interrupted by any of the disk adapter interrupts. Four of the core CPUs execute respective real-time threads, and at least one thread of the network stack is incorporated into each of the respective real-time threads of said four of the core CPUs, and the single one of the core CPUs executes one of the real time threads into which is incorporated at least one thread of the network stack, and each of the core CPUs executes one hard affinity thread instance of the disk adapter driver.

In accordance with another aspect, the invention provides a network file server including a data processor, a disk storage array storing data, network adapters linking the data processor to a data network for exchange of data packets between the data processor and clients in the data network, and storage adapters linking the data processor to the disk storage array for exchange of data blocks between the data processor and the disk storage array. The data processor includes at least eight core central processing units (CPUs), and shared memory shared among the core CPUs and containing programs executed by the core CPUs. The programs executable by the core CPUs include a real-time scheduler scheduling execution of real-time and general purpose threads, and a thread manager managing execution of hard affinity threads and soft affinity threads of the general purpose threads. Each of the hard affinity threads is executed exclusively by a respective one of the core CPUs, and the thread manager distributes execution of the soft affinity threads among the core CPUs for load balancing. The programs executed by the core CPUs further include a network adapter interrupt routine responding to interrupts from the network adapters when the network adapters receive data packets from the data network, a network stack transmitting data through the network adapters between the data processor and the data network in accordance with a network data transmission protocol, a file system stack providing clients in the data network with access to the data storage array in accordance with a file system access protocol and maintaining an in-core file system cache in the shared memory, a storage access driver accessing the data storage array in accordance with a storage access protocol, and a disk adapter interrupt routine responding to interrupts from the disk adapters when the disk adapters receive data blocks from the disk storage array. Threads of the network stack are incorporated into the real time threads that are scheduled by the real-time scheduler and executed exclusively by a plurality of the core CPUs that are not interrupted by the disk adapter interrupts so that the disk adapter interrupts do not interrupt execution of the network stack, instances of the storage access driver are hard affinity threads, and the soft affinity threads include a multitude of instances of a thread of the file system stack for file access request processing so that file access request processing for a multitude of concurrent file access requests is load balanced over the core CPUs. Four of the core CPUs execute respective real-time threads, and at least one thread of the network stack is incorporated into each of the respective real-time threads of said four of the core CPUs. Pairs of the core CPUs share respective level-two (L2) cache memories, each core CPU that executes one of the real-time threads into which is incorporated at least one thread of the network stack shares a respective one of the level-two (L2) cache memories with another one of the core CPUs that executes one of the real time threads into which is incorporated at least one thread of the network stack, and each of the core CPUs executes one hard affinity thread instance of the disk adapter driver.

BRIEF DESCRIPTION OF THE DRAWINGS

Additional features and advantages of the invention will be described below with reference to the drawings, in which.

Figure 1:
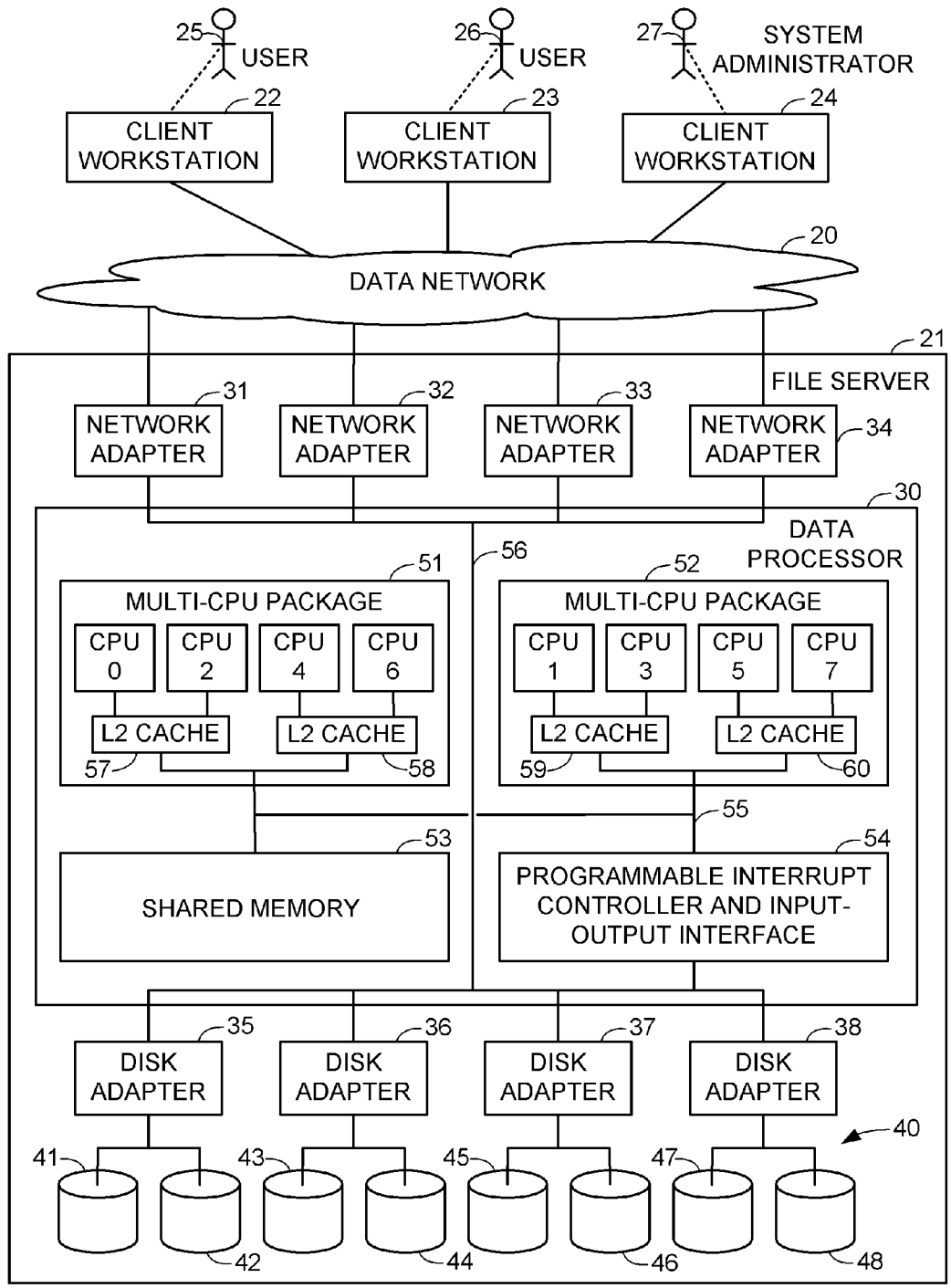
FIG. 1 is block diagram of a data processing system including a network file server having a multi-CPU commodity general purpose digital computer.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data processing network 20 including a network file server 21 and client workstations 22, 23, and 24 operated by human users 25, 26, and 27. The data network 20, for example, is an Ethernet or Internet Protocol (IP) data network. The user 28 is a system administrator responsible for configuration and maintenance of the data processing system.

The file server 21 includes a data processor 30, a disk storage array 40, network adapters 31, 32, 33, 34 for linking the data processor 30 to the data network 20, and disk adapters 35, 36, 37, and 38 for linking the data processor 30 to respective strings of disk drives 41, 42, 43, 44, 45, 46, 47, and 48 in the disk storage array 40.

The data processor 30 is a multi-CPU commodity general purpose digital computer including two multi-CPU packages 51, 52 sharing a random access memory 53 and a programmable interrupt controller and input-output interface 54. For example, the data processor 30 is typically purchased as a single printed circuit mother board or server blade including a certain minimal amount of random access memory and some network interfaces. Additional random access memory is added as appropriate for a network file server having a desired data storage capacity. Typically some additional network interface cards and disk adapter cards are also added to provide the desired number of network adapters 31-34 and disk adapters 35-38. For example, the network interface cards are Ethernet cards, and the disk adapter cards are SCSI or Fibre-Channel (FC) cards.

Presently the multi-CPU packages 51 and 52 on a typical file server blade each include four CPUs. In a conventional fashion, the four CPUs in the first multi-CPU package 51 are designated CPU 0, CPU 2, CPU 4, and CPU 6, and the four CPUs in the second multi-CPU package 52 are designated CPU 1, CPU 3, CPU 5, and CPU 7. It is well known that each CPU includes a respective micro-control unit, instruction decoder pipeline, arithmetic logic unit, data register set, and level-one (L1) cache memory for storing program instructions and data. Each multi-CPU package 51, 52 also includes two separate level-two (L2) cache memories, and each of the level-two (L2) cache memories is shared by a respective pair of CPUs in each package. Thus, CPU 0 and CPU 2 share a level-two (L2) cache memory 57, CPU 2 and CPU 4 share a level-two (L2) cache memory 58, CPU 1 and CPU 3 share a level-two (L2) cache memory 59, and CPU 5 and CPU 7 share a level-two (L2) cache memory 60.

Figure 2:
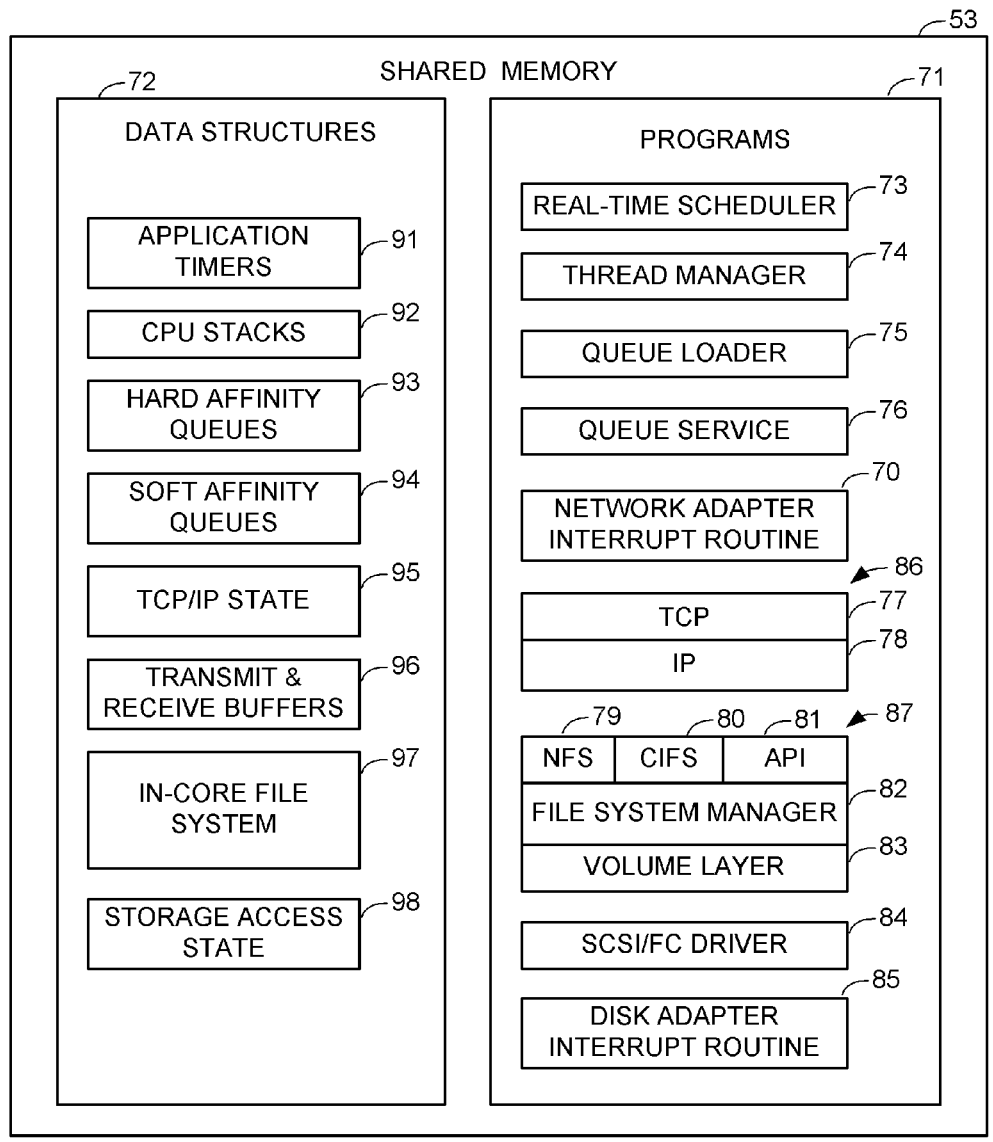
FIG. 2 is a block diagram of programs and data structures in shared memory in the network file server of FIG. 1.

FIG. 2 shows programs 71 and data structures 72 in the shared memory 53. The programs include a real-time scheduler 73, a thread manager 74, a queue loader 75, a queue service routine 76, a network adapter interrupt routine 70, a Transmission Control Protocol module 77, an Internet Protocol module 78, a Network File System (NFS) module 79, a Common Internet File System (CIFS) module 80, an Application Program Interface (API) module 81, a file system manager 82, a volume layer 83, a SCSI/FC driver 84, and a disk adapter interrupt routine 85. The data structures 72 include application timers 91, CPU stacks 92, hard affinity queues 93, soft affinity queues 94, TCP/IP state 95, transmit and receive buffers 96, an in-core file system 97, and storage access state 98.

Figure 3:
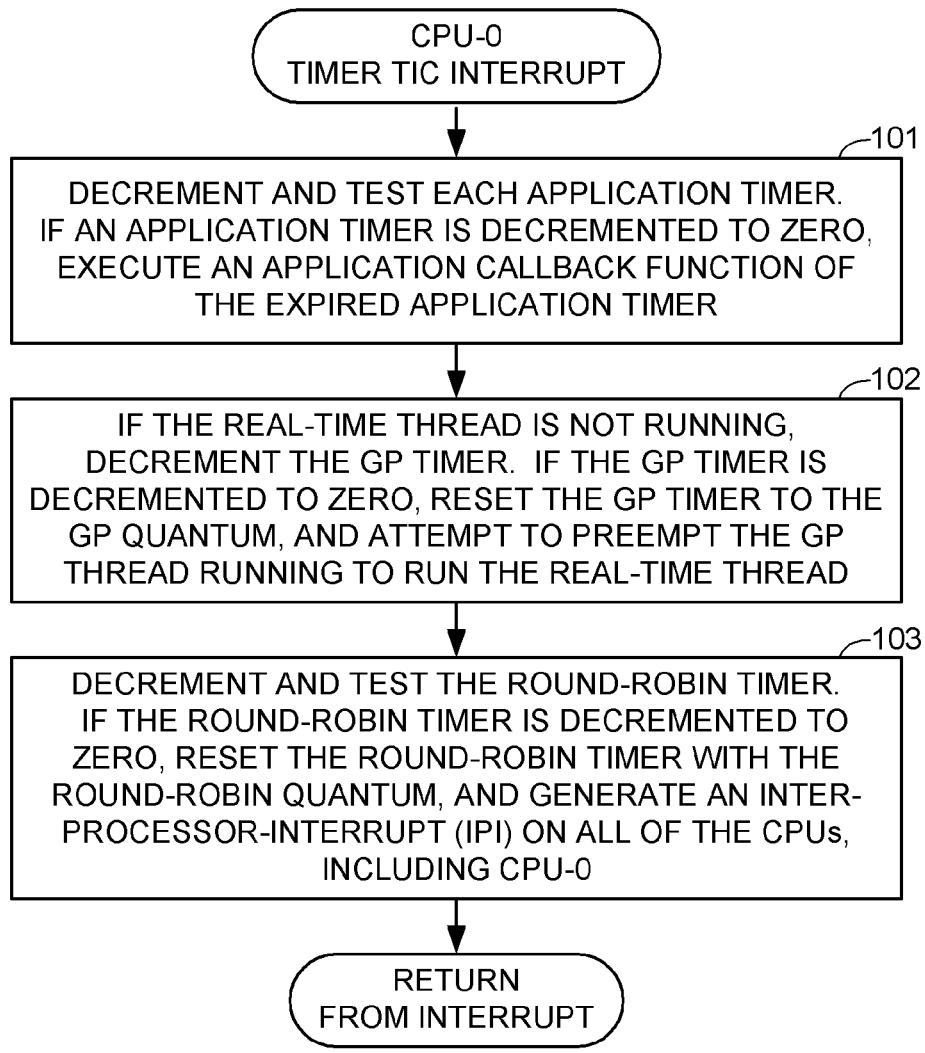
FIG. 3 is a flowchart of a "timer tic" interrupt routine executed by one of the core CPUs in the network file server of FIG. 1.
Figure 4:
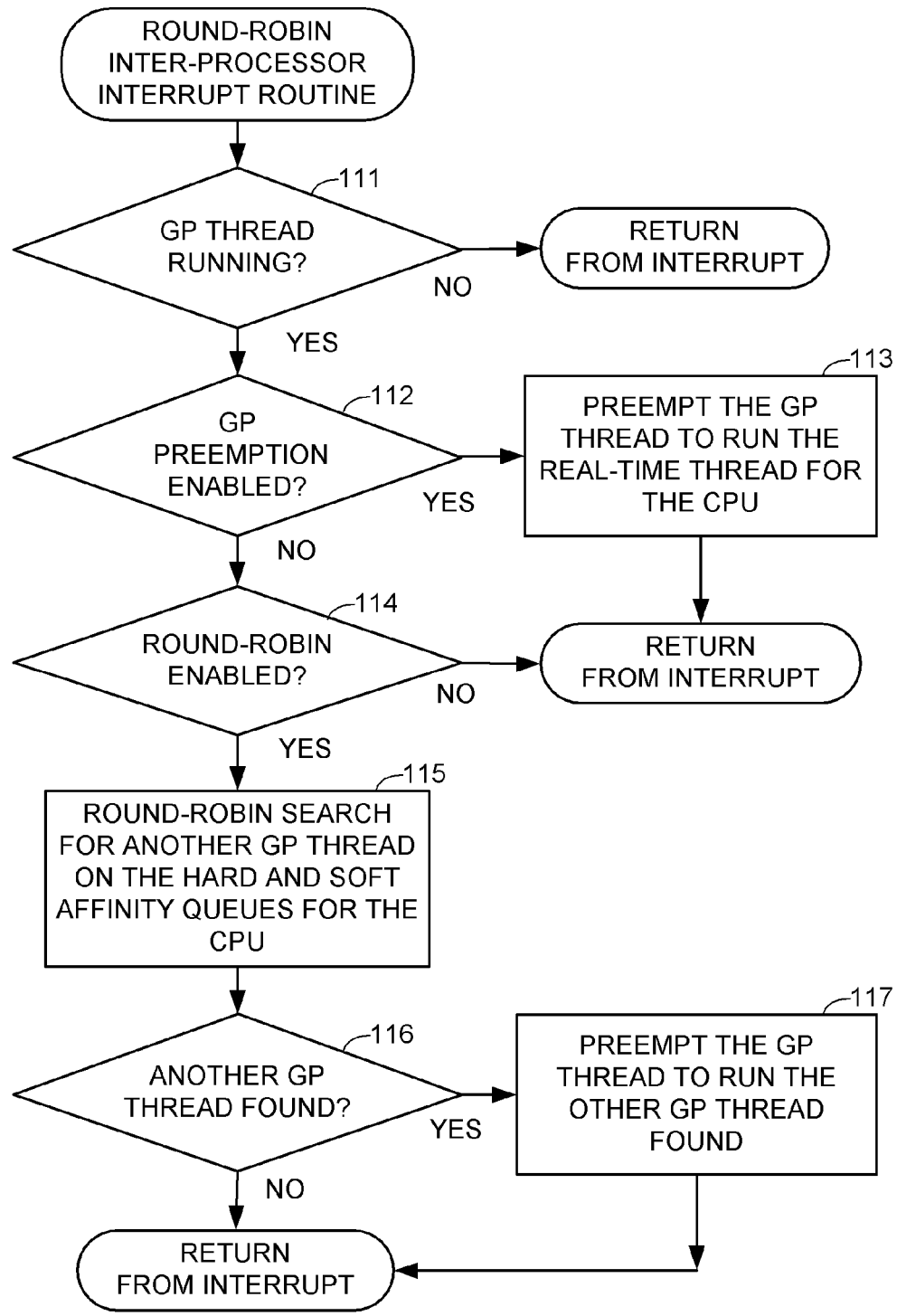
FIG. 4 is a flowchart of a round-robin inter-processor interrupt routine executed by each of the core CPUs in the network file server of FIG. 1.

The real-time scheduler 73 maintains the application timers 91, and schedules execution and context switching between real-time (RT) and general purpose (GP) code threads, as will be further described with respect to FIGS. 3 and 4. The thread manager 74 performs the execution and context switching by searching the queues 93, 94 and exchanging CPU context between the CPU stacks 92 and thread state information of code threads on the queues 93 and 94. The queue loader 75 and the queue service routine 76 more specifically perform the loading and servicing of the queues 73, 74. Further details of the thread manager 74, queue loader 85, and the queue service routine 86 are found in Bono U.S. Pat. No. 7,178,145, incorporated herein by reference.

The network adapter interrupt routine 70 is executed in response to an interrupt signal from a network adapter when the network adapter receives a data packet from the data network and is ready to send the data packet to the data processor. The network adapter interrupt routine 70 changes the TCP/IP state 95 to indicate that the data packet has been received by the particular network adapter.

The TCP module 77 and the IP module 78 together comprise what is commonly known as the "network stack" 86. The IP module 78 handles transmission and reception of IP data packets from the network adapters (31-34 in FIG. 1). The TCP module 77 maintains reliable connections between the network clients (22, 23, 24 in FIG. 1) and the file server (21 in FIG. 1) by requesting re-transmission of IP data packets when the packets are found to be missing from the sequence of the packets received for a particular connection. The transmit and receive buffers 96 include a respective transmit buffer and a respective receive buffer associated with each active TCP connection between a network client process and an application process of the network file server. The TCP module 77 maintains TCP/IP state 95 indicating the active TCP connections and the buffers and remote IP address associated with each active connection. The TCP module 77 includes a send function for sending data that is written to the transmit buffer and transmitted to the network client process, and a receive function receiving data that is received from the network client process and read from the receive buffer.

The NFS module 79, CIFS module 80, API module 81, file system manager 82, and volume layer 83 together comprise what is commonly known as the "file system stack" 87. The file system stack 87 performs file system processing in response to a file access command. The NFS module 79 recognizes file access commands received from the client workstations (22, 23, and 24 in FIG. 1) in accordance with the NFS protocol. The CIFS module 80 recognizes file access commands received from the client workstations (22, 23, and 24 in FIG. 1) in accordance with the CIFS protocol. For example, network clients such as UNIX (Trademark) workstations may use the Network File System (NFS) protocol to access files in the disk storage array (40 in FIG. 1), and network clients such as Microsoft Windows (Trademark) workstations may use the Common Internet File System (CIFS) protocol to access files in the disk storage array (40 in FIG. 1).

The application program interface (API) module 81 recognizes additional file access commands which may extend the functionality of the NFS and CIFS protocols. For example, if the NFS module 79 or the CIFS module 80 receives a file access request including an operation code that is not in accordance with the NFS or CIFS protocol, then the NFS module 79 or the CIFS module 80 will invoke the API module 81 in an attempt to execute the operation or function. The API module 81 may also respond to remote procedure calls from network clients in accordance with other network protocols, such as the Simple Network Management Protocol (SNMP) or the Hypertext Transfer Protocol (HTTP).

The file system manager 82 manages hierarchical file systems in the disk storage array (40 in FIG. 1). The file system manager 82 also maintains an "in core" cache of the file system 97. A suitable kind of file system is the UNIX file system, as described in Chapter 9, pp. 261-289 of Uresh Vahalia, Unix Internals: The New Frontiers, 1996, Prentice Hall, Inc., Simon & Schuster, Upper Valley River, N.J. 07458. The file system manager 82 is further described in Vahalia et al. U.S. Pat. No. 5,893,140 issued Apr. 6, 1999, entitled "File Server Having a File System Cache and Protocol for Truly Safe Asynchronous Writes," incorporated herein by reference.

The volume layer 83 organizes the storage of the disk array (40 in FIG. 1) into logical volumes of data blocks. The Small Computer System Interface (SCSI) or Fibre-Channel (FC) driver 84 links the volume layer 83 to the disk storage array (40 in FIG. 1). The File System Manager 82 and the SCSI/FC driver 84 maintain the storage access state 98 of pending storage access requests for transfer of data between the in-core file system 97 and the disk storage array (40 in FIG. 1). The disk adapter interrupt routine 85 is executed in response to an interrupt signal from a disk adapter when the disk adapter has received a block of data from the disk array and is ready to send the block of data to the data processor. The disk adapter interrupt routine 85 changes the storage access state 98 to indicate that the block of data has been received by the particular disk adapter.

FIG. 3 shows a "timer tic" interrupt routine executed by CPU 0 in the network file server of FIG. 1. CPU 0 is dedicated to servicing application timers and general purpose threads that require a certain guaranteed minimum amount of processing time, referred to as the GP quantum. CPU 0 also periodically interrupts all of the other processors at a certain period referred to as the round-robin quantum. In a first step 101, in response to a periodic "timer tic" interrupt signal, CPU 0 decrements and tests each of the application timers (91 in FIG. 2). If an application timer is decremented to zero, then CPU 0 executes an application callback function of the expired application timer.

In step 102, if a real-time thread of CPU 0 is not running, then CPU 0 decrements a GP timer. If the GP timer is decremented to zero, then the GP timer is reset to the GP quantum, and an attempt is made to preempt the GP thread that is running to run the real-time thread of CPU 0. For example, the attempt is successful if a GP preemption enable state is set for CPU 0.

In step 103, CPU 0 decrements and tests a round-robin timer. If the round-robin timer is decremented to zero, then CPU 0 resets the round-robin timer with the round-robin quantum, and generates an inter-processor interrupt (IPI) on all of the core CPUs, including CPU 0. After step 103, execution of CPU 0 returns from the timer-tic interrupt.

FIG. 4 shows the round-robin inter-processor interrupt routine executed by each of the core CPUs. In a first step 111, if a GP thread is not running on the CPU, then execution of the CPU returns from the interrupt. Otherwise, execution continues from step 111 to 112. In step 112, if GP preemption is enabled, then execution branches from step 112 to step 113. In step 113, the GP thread is preempted to run the real-time thread for the CPU. Preemption of the GP thread to run the real-time thread involves placing previously-saved CPU register context of the real-time thread on the CPU stack so that when execution returns from the interrupt after step 113, execution resumes with the execution of the real-time thread instead of the GP thread that was interrupted by the round-robin inter-processor interrupt.

In step 112, if GP preemption is not enabled, then execution continues from step 112 to step 114. In step 114, if "round-robin" is not enabled for the CPU, then execution returns from the interrupt, so that execution of the GP thread resumes.

In step 114, if "round-robin" is enabled for the CPU, then execution continues from step 114 to step 115. In step 115, the CPU performs a round-robin search for another CP thread on the hard and soft affinity queues for the CPU. For example, the thread manager maintains a round-robin pointer to each of the hard and soft affinity queues. The round-robin search involves alternately advancing the round-robin pointers for the hard and soft affinity queues of the CPU until a next GP thread is found. If a round-robin pointer reaches the end of its respective queue, then it is reset to point to the beginning of its respective queue. In step 116, if another GP thread is not found by the round-robin search, then execution returns from the interrupt to resume execution of the GP thread that was interrupted by the round-robin inter-processor interrupt. Otherwise, if another GP thread was found, then execution branches from step 116 to step 117 to preempt the interrupted GP thread to run the other GP thread found. This involves swapping the context of the interrupted GP thread on the CPU stack with GP thread of the other GP thread previously saved by the thread manager. After step 117, execution returns from the inter-processor interrupt in order to resume execution of the other GP thread.

It should be understood that the real-time scheduler of FIGS. 3 and 4 provides a general framework for multi-tasking by switching the context of each CPU between execution of a thread manager, a real-time thread for the CPU, and general-purpose threads on the hard and soft affinity queues of the CPU. The real-time thread for the CPU is programmed in an appropriate fashion for effective use of this framework, depending on the particular real-time tasks to be performed.

Figure 5:
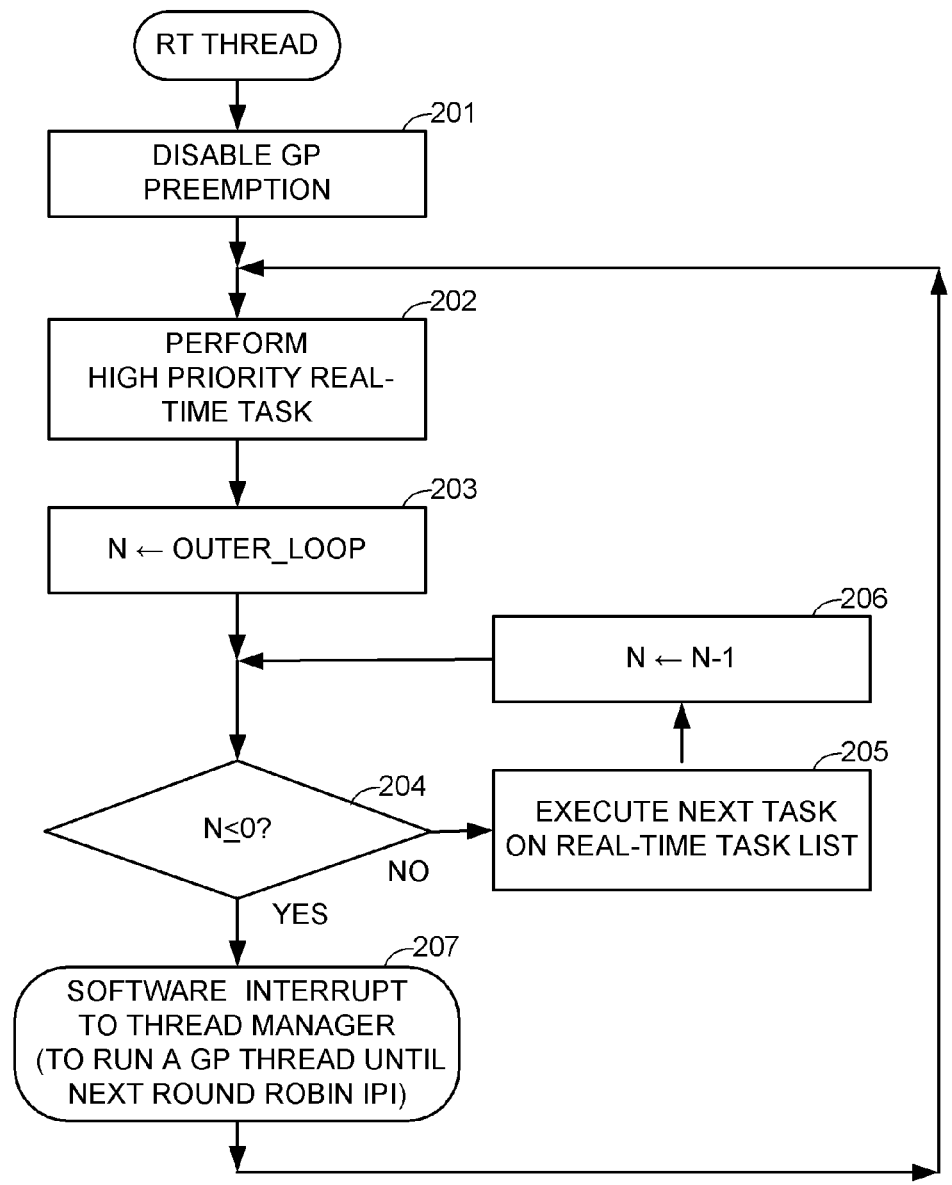
FIG. 5 is a flowchart of the real-time thread for a first core CPU in the network file server of FIG. 1.

For example, FIG. 5 shows a conventional way of programming the real-time thread for the first core CPU in the file server of FIG. 1 in order to perform a high priority real-time task and a series of lower priority tasks on a real-time task list. In response to the round-robin IPI, the high-priority real-time task is performed, and then a certain number of the lower priority tasks are performed. The certain number is set by the value of an "OUTER_LOOP" parameter.

In a first step 201 of FIG. 5, GP preemption is disabled. In step 202, the high-priority real-time task is performed. In step 203, an inner loop counter "N" is set equal to the value of the "OUTER_LOOP" parameter. In step 204, if the counter "N" does not have a value less than or equal to zero, then execution branches to step 205 to execute a next task on the real-time task list. If the end of the list is reached, then the task at the beginning of the list is executed. In step 206, the counter "N" is decremented by one, and execution loops back to step 204. Once the counter "N" is decremented to zero, execution continues from step 204 to step 207.

In step 207, the real-time task performs a software interrupt to an entry point of the thread manager for switching context to a general-purpose thread. In this case, the thread scheduler responds to a software interrupt from the real-time thread by performing a round-robin search of the hard and soft affinity queues of the CPU (and a search of the soft affinity queues of the other CPUs, if no GP thread is found in the hard and soft affinity queue of the CPU). If no such GP thread is found, then the thread manager executes a "return from interrupt" instruction to return execution to the real-time thread. If such a GP thread is found, then the thread manger does a context switch from the real-time thread to the GP thread by removing and saving the CPU context of the real-time thread from the CPU stack and replacing it with saved context of the GP thread and then executing a "return from interrupt" instruction in order to return execution to the GP thread.

Figure 6:
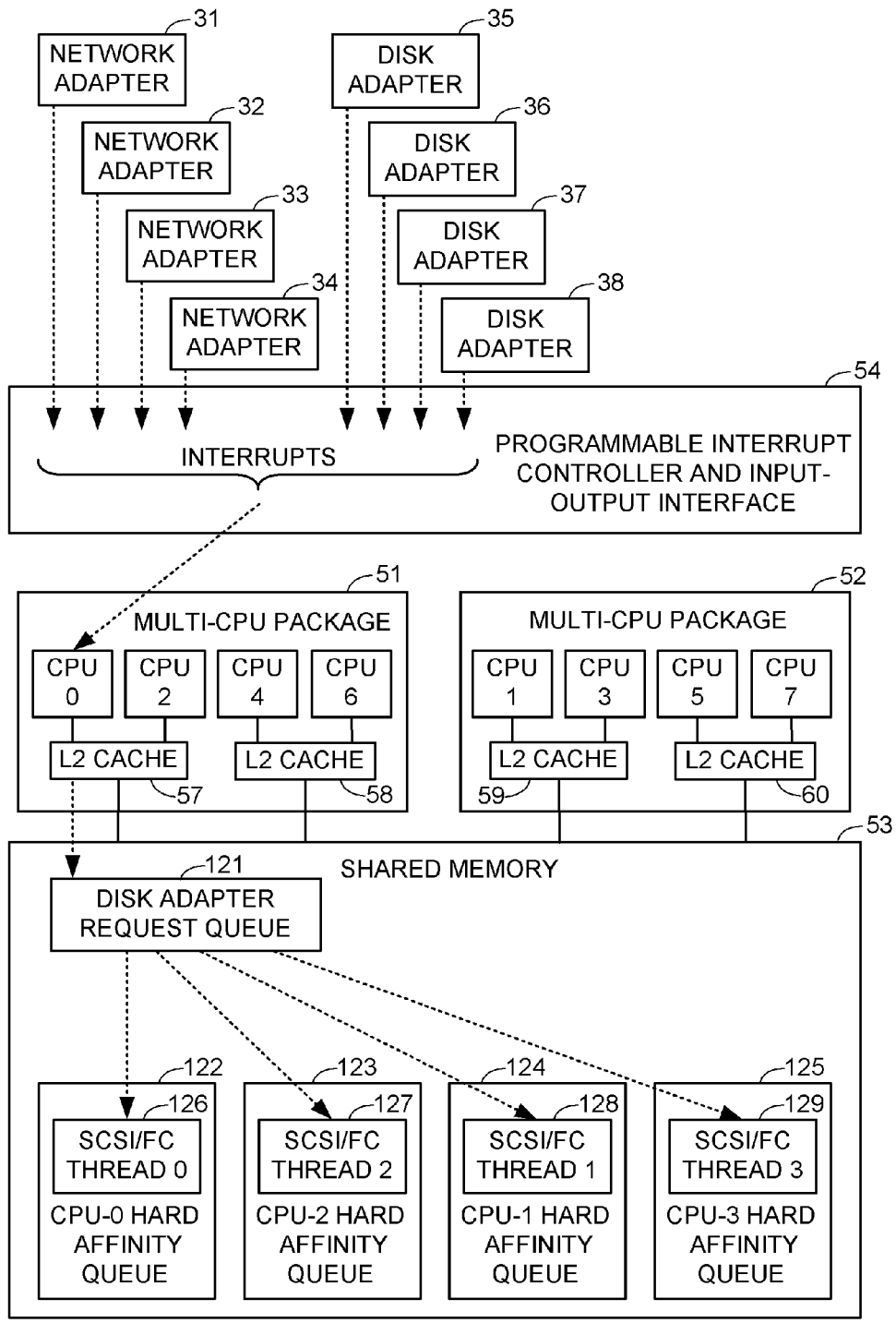
FIG. 6 is a block diagram showing a conventional assignment of interrupts and code threads to the core CPUs in the network file server of FIG. 1.

FIG. 6 shows how interrupts and code threads have been assigned to the core CPUs in the EMC Corporation CELERRA brand of network file server. The programmable interrupt controller 54 was programmed to map the interrupts of all of the network adapters 31, 32, 33, 34 and all of the disk adapters 35, 36, 37, 38 to CPU 0. CPU 0 executed a disk adapter interrupt routine to load disk adapter requests into a disk adapter request queue 121 in the shared memory 53. The disk adapter requests were serviced by hard affinity SCSI/FC threads 126, 127, 128, 129 in the respective hard affinity queues 122, 123, 124, 125 of CPU 0, CPU 2, CPU 1, and CPU 3. When executed, the SCSI/FC service thread would look for a service request on the disk adapter request queue, and if one was found on the queue, then the SCSI/FC service thread would service the request. In particular, if the queue was empty, the SCSI/FC service thread would return to the thread manager, else if the queue was locked, the SCSI/FC service thread would try again, else the SCSI/FC service thread would lock the queue, remove a service request, unlock the queue, and then service the service request. CPU 0 was also programmed to perform the "timer tic" interrupt of FIG. 2, and the real-time thread of CPU 0 performed the network stack processing of the TCP layer (77 in FIG. 2) and the IP layer (78 in FIG. 2). Each network adapter interrupt resulted in a change in TCP/IP state. When executed, network stack processing of the real-time (RT) thread of CPU-0 would detect and service the change in TCP/IP state. File system processing was performed by many NFS hard affinity threads assigned to the CPUs.

Figure 7:
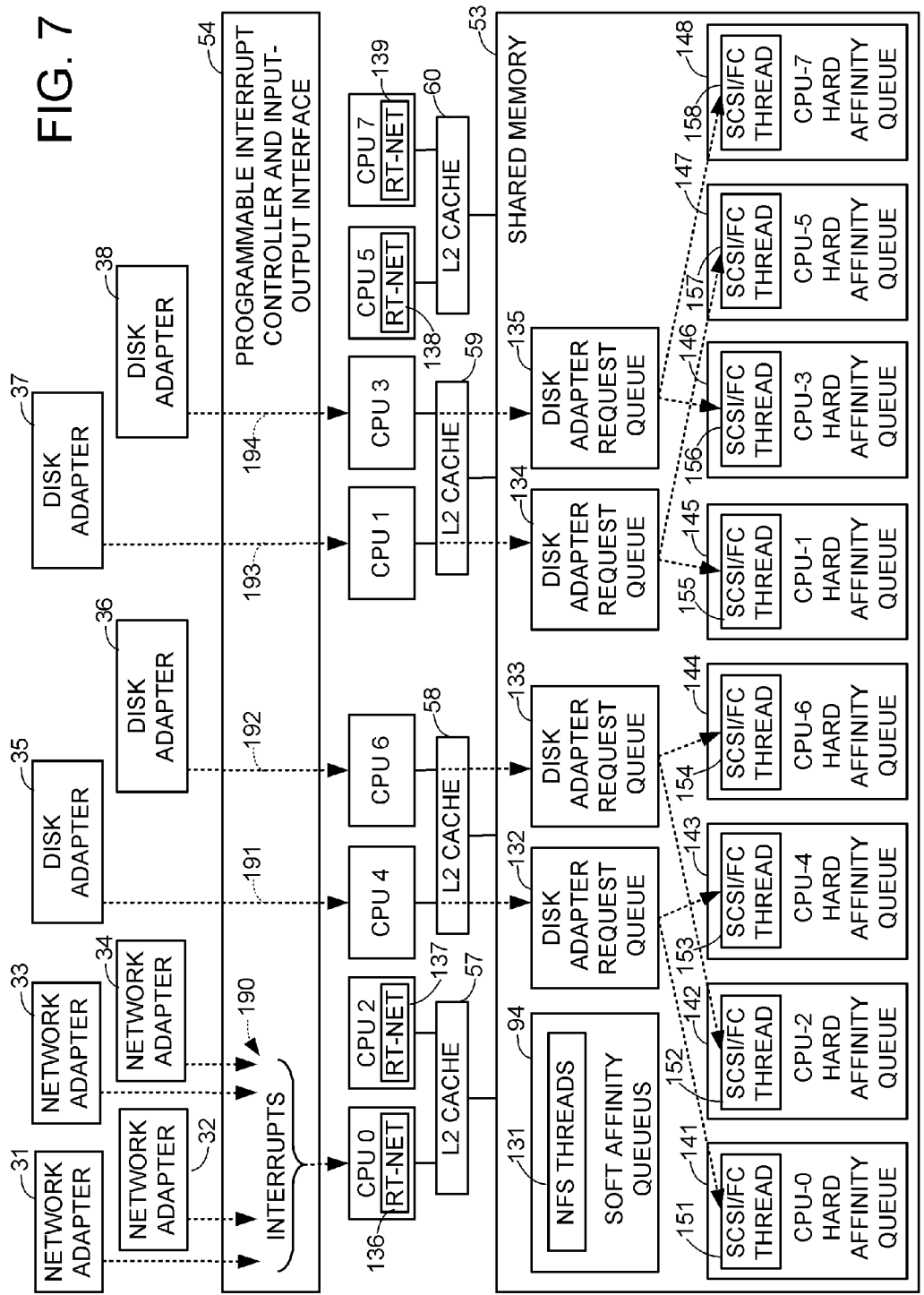
FIG. 7 is a block diagram showing a new assignment of interrupts and code threads to the network file server core CPUs in accordance with a first embodiment of the present invention.

FIG. 7 shows a new assignment of interrupts and code threads to the network file server core CPUs in accordance with a first embodiment of the present invention. It has been discovered that a substantial performance improvement in the network file server of FIG. 1 will result by changing the assignment of interrupts and code threads to the core CPUs from the old configuration of FIG. 6 to the new configuration of FIG. 7. The particular assignment of interrupts and code threads to the core CPUs as shown in FIG. 7 provides better balancing of CPU usage across the CPUs and a decrease in latency in responding to network client requests for file access.

The particular assignment of interrupts and code threads to the core CPUs affects CPU usage and response latency in a complex way. In general, latency is increased when all interrupts are managed or routed by a single process. The processing of interrupts is serialized when the interrupts are processed a single processor, so it increases the response time for interrupted applications. Having interrupts routed to more than one CPU allows parallelism and decreases latency. Interference between conflicting tasks also leads to latency as threads are stalled. CPU usage is still required for servicing the stalled threads in such a way that execution of the stalled threads is resumed quickly once the conflicts are resolved. Thus, a rigid assignment of the interrupts and code threads to the core CPUs may avoid interference between conflicting tasks, but a rigid assignment may result in an imbalance of CPU usage.

A general approach to addressing the problem of assigning interrupts and code threads to the core CPUs recognizes that a rigid assignment of interrupts and code threads to the CPUs is most appropriate for interrupts and code threads that present the highest priority in terms of a need for timely execution for avoidance of costly conflicts. According to this ranking of priority, network adapter interrupts and disk adapter interrupts have the highest priority, followed by network stack processing, followed by disk adapter servicing, followed by file system processing.

Under the assumption that file system processing should have the least rigid assignment to the CPUs, the NFS threads 131 in FIG. 7 are placed in the soft affinity queues 94. For example, initially sixty-four instances of an NFS thread are placed in each of the soft affinity queues, so that there are a total of 512 instances of the NFS thread managed by the thread manager. NFS request processing is often waiting for network and disk processing, and interference between the higher priority threads is more costly and better avoided by more rigid assignment of the higher priority threads to the CPUs. The thread manager automatically deals with any CPU load imbalance (caused in part by a rigid assignment of the interrupts and high priority threads) by moving at least some of the soft affinity NFS threads 131 from the soft affinity queues of the more heavily-loaded CPUs to the soft affinity queues of the more lightly-loaded CPUs so that the more lightly-loaded CPUs execute the majority of the NFS threads. In this fashion, file access request processing by the file system stack for a multitude of concurrent file access requests is load balanced over the core CPUs.

Under the assumption that interrupts should be assigned rigidly for best conflict avoidance, CPU usage due to the network adapter interrupts and disk adapter interrupts was measured for the system in FIG. 6. It was found that the time for handling the network adapter interrupts was almost insignificant (less than 1% CPU 0 usage) but the time for handling the disk adapter interrupts was significant (6% of CPU usage even if each disk adapter interrupt was mapped to a different CPU). Therefore, to avoid conflicts caused by the significant CPU usage for handling the disk adapter interrupts, the disk adapter interrupts in FIG. 7 are mapped to more than one CPU different from CPU 0, and the disk adapter interrupts no longer interrupt network stack processing.

Figure 8:
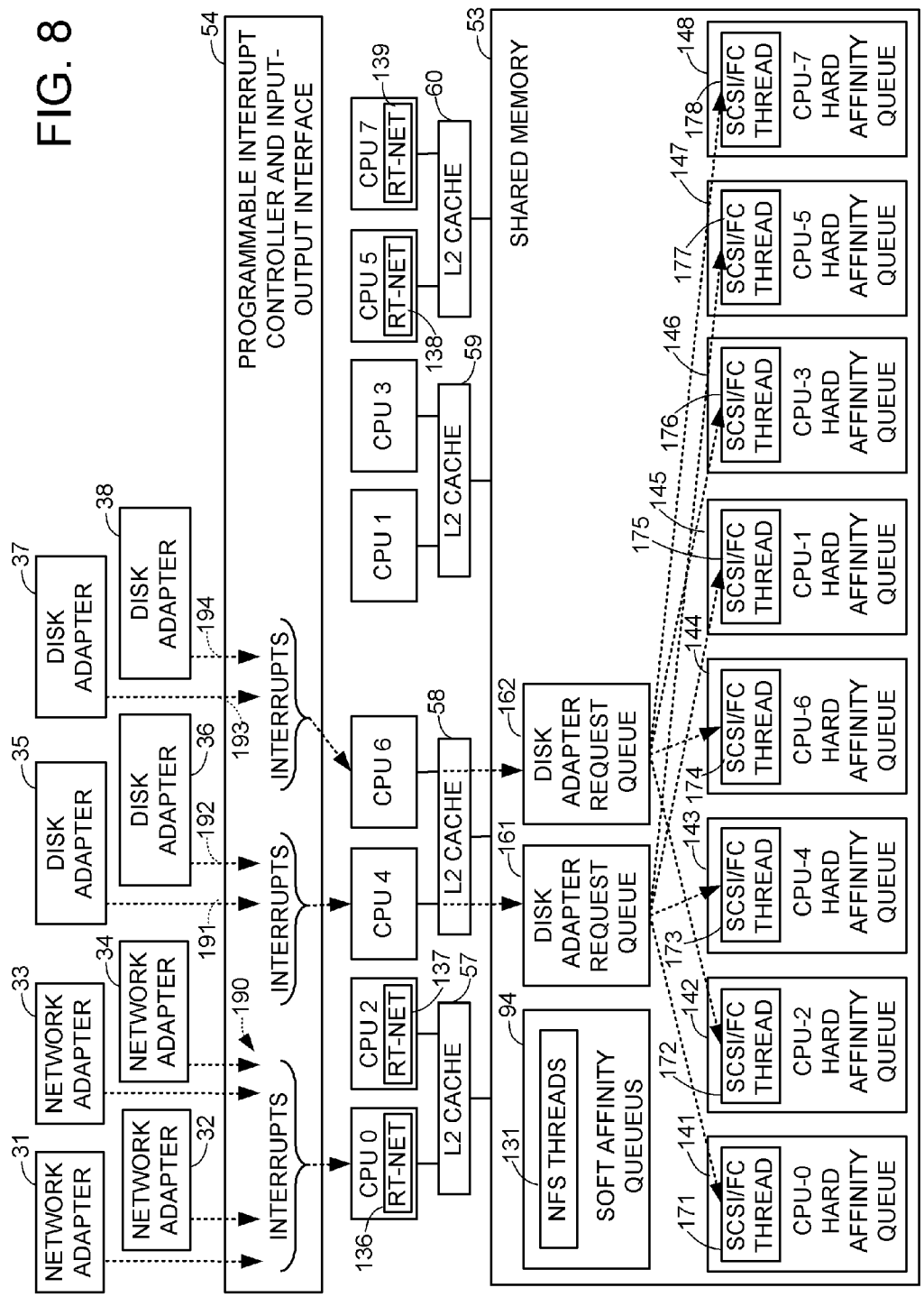
FIG. 8 is a block diagram showing a new assignment of interrupts and code threads to the network file server core CPUs in accordance with a second embodiment of the present invention.

Because CPU 0 is no longer interrupted by disk adapter interrupts in FIG. 8, CPU 0 can handle the "timer tic" interrupts and the network adapter interrupts without significant interference. CPU 0 can also handle relatively time-critical network stack processing by the RT thread assigned to CPU 0 without significant interference.

As shown in FIG. 7, the network adapter interrupts 190 are still mapped to CPU 0. The interrupt 191 from the disk adapter 35 is mapped to CPU 4. The interrupt 192 from disk adapter 36 is mapped to CPU 6. The interrupt 193 from disk adapter 37 is mapped to CPU 1. The interrupt 194 from disk adapter 38 is mapped to CPU 3. CPU 4 has a disk adapter request queue 132, CPU 6 has a disk adapter request queue 133, CPU 1 has a disk adapter request queue 134, and CPU 3 has a disk adapter request queue 135. By providing a separate disk adapter request queue for each CPU interrupted by disk adapter interrupts, more efficient use is made of the level-one and level-two caches. For example, each disk adapter queue has an associated Mutex and Condition Variable stored per CPU and aligned on the boundaries of the level-two cache. Therefore the lock status and an or empty or full condition of each disk adapter queue can be read from or written to the level-two cache associated with the queue in a single atomic operation.

The network stack processing should be performed on at least one pair of dedicated CPUs sharing a level-two cache. So long as the disk adapter interrupts do not interrupt network stack processing, no more that four CPUs are needed for network stack processing even if CPU 0 is one of these four CPUs. Latency in network stack processing affects latency in responding to client requests, and the effect is often significant for client access to the in-core file system. Therefore it is best not only to affine the network stack processing to certain CPUs but also to include the network stack processing in the real time threads of these CPUs. In this fashion, it is possible to obtain a 30% decrease in the latency in the network stack processing, which is important in some applications.

It is desirable for the CPU handling the network adapter interrupts (CPU 0) to be one of the CPUs handling the network stack processing so that the TCP/IP state changed by the network adapter interrupt handling routine may often be accessed from the L1 cache by the real-time thread handling the low-level IP processing. Thus, at least the real-time thread (RT-NET 136) of CPU 0 and preferably also the real-time thread (RT-NET 137) of CPU 2 (which shares the level-two cache 57 with CPU 0) should perform this low-level IP processing. This low-level IP processing receives IP packets from the network adapters and sends IP packets to the network adapters.

In FIG. 7, the real-time threads (RT-NET 138 and RT-NET 139) of CPU 5 and CPU 7 also perform network stack processing, including the high-level network stack processing that services the network transmit and receive buffers (96 in FIG. 2). This high-level network stack processing loads the receive buffers with data from the network adapters, and sends data from the transmit buffers to the network adapters. The respective real-time threads 136, 137 of CPU 0 and CPU 2 may also perform high-level network stack processing in their spare time.

The "OUTER_LOOOP" parameter for the real-time thread of FIG. 5 is set on a per-CPU basis so that the real-time threads of CPU 0, CPU 2, CPU 5, and CPU 7 have higher values of "OUTER_LOOOP" than CPU 4, CPU 6, CPU 1, and CPU 2 in order to allocate more CPU processing time to the respective real-time threads of CPU 0, CPU 2, CPU 5, and CPU 7 for the RT-NET network stack processing tasks in CPU 0, CPU 2, CPU 5, and CPU 7.

It is desirable to use at least four SCSI/FC hard affinity threads kept on respective hard affinity queues of at least the CPUs interrupted by the disk adapters. No more than one SCSI/FC thread need be kept on the hard affinity queue of each CPU. The SCSI/FC thread on the hard affinity queue of each CPU handling disk adapter interrupts services the disk adapter request queue of that CPU. Each of the CPUs may have an SCSI/FC thread on its hard affinity queue. Multiple SCSI/FC threads can efficiently service queues assigned to the CPUs with an appropriate assignment of the SCSI/FC threads to hard affinity queues and priority servicing keeping in mind L2 cache sharing between respective pairs of the CPUs.

For example, as shown in FIG. 7, each hard affinity queue holds one SCSI/FC thread and each SCSI/FC thread services a respective one of the disk adapter request queues. The disk adapter request queue 132 is serviced by the SCSI/FC thread 151 in the hard affinity queue 141 of CPU 0, and by the SCSI/FC thread 153 in the hard affinity queue 143 of CPU 4. The disk adapter request queue 133 is serviced by the SCSI/FC thread 152 in the hard affinity queue 142 of CPU 0, and by the SCSI/FC thread 154 in the hard affinity queue 144 of CPU 6. The disk adapter request queue 134 is serviced by the SCSI/FC thread 155 in the hard affinity queue 145 of CPU 1, and by the SCSI/FC thread 157 in the hard affinity queue 147 of CPU 5. The disk adapter request queue 135 is serviced by the SCSI/FC thread 156 in the hard affinity queue 146 of CPU 3, and by the SCSI/FC thread 158 in the hard affinity queue 148 of CPU 7.

FIG. 8 shows an alternative assignment of disk adapter interrupts to the CPUs. The interrupts 191 and 192 of the disk adapters 35 and 36 are mapped to CPU 4, and the interrupts 193 and 194 of the disk adapters 37 and 38 are mapped to CPU 6. CPU 4 responds to an interrupt from the disk adapter 35 or from the disk adapter 36 by placing a disk adapter request in a first disk adapter request queue 161. CPU 6 responds to an interrupt from the disk adapter 37 or the disk adapter 38 by placing a disk adapter request in a second disk adapter request queue 162. In this alternative example, the first disk adapter request queue 161 is serviced by the SCSI/FC thread 171 on the hard affinity queue 141 of CPU 0, and by the SCSI/FC thread 173 on the hard affinity queue 143 of CPU 4, and by the SCSI/FC thread 175 on the hard affinity queue 145 of CPU 1, and by the SCSI/FC thread 177 on the hard affinity queue 147 of CPU 5. The second disk adapter request queue 132 is serviced by the SCSI/FC thread 172 on the hard affinity queue 142 of CPU 0, and by the SCSI/FC thread 174 on the hard affinity queue 144 of CPU 4, and by the SCSI/FC thread 176 on the hard affinity queue 146 of CPU 1, and by the SCSI/FC thread 178 on the hard affinity queue 148 of CPU 5.

Figure 9:
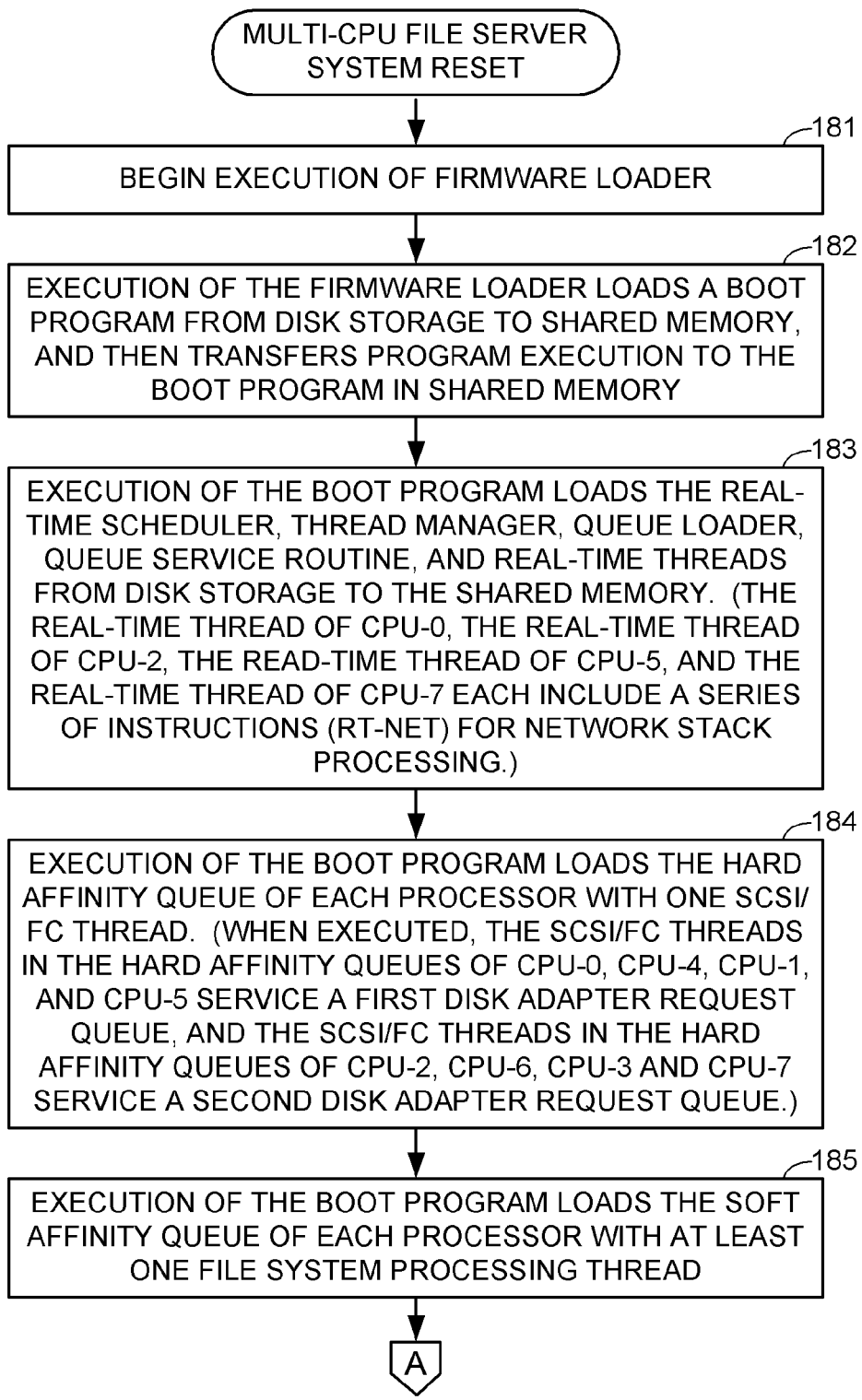
FIGS. 9 and 10 together comprise a flowchart of the loading of the code threads of FIG. 8 into the memory of the network file server in response to a system reset.
Figure 10:
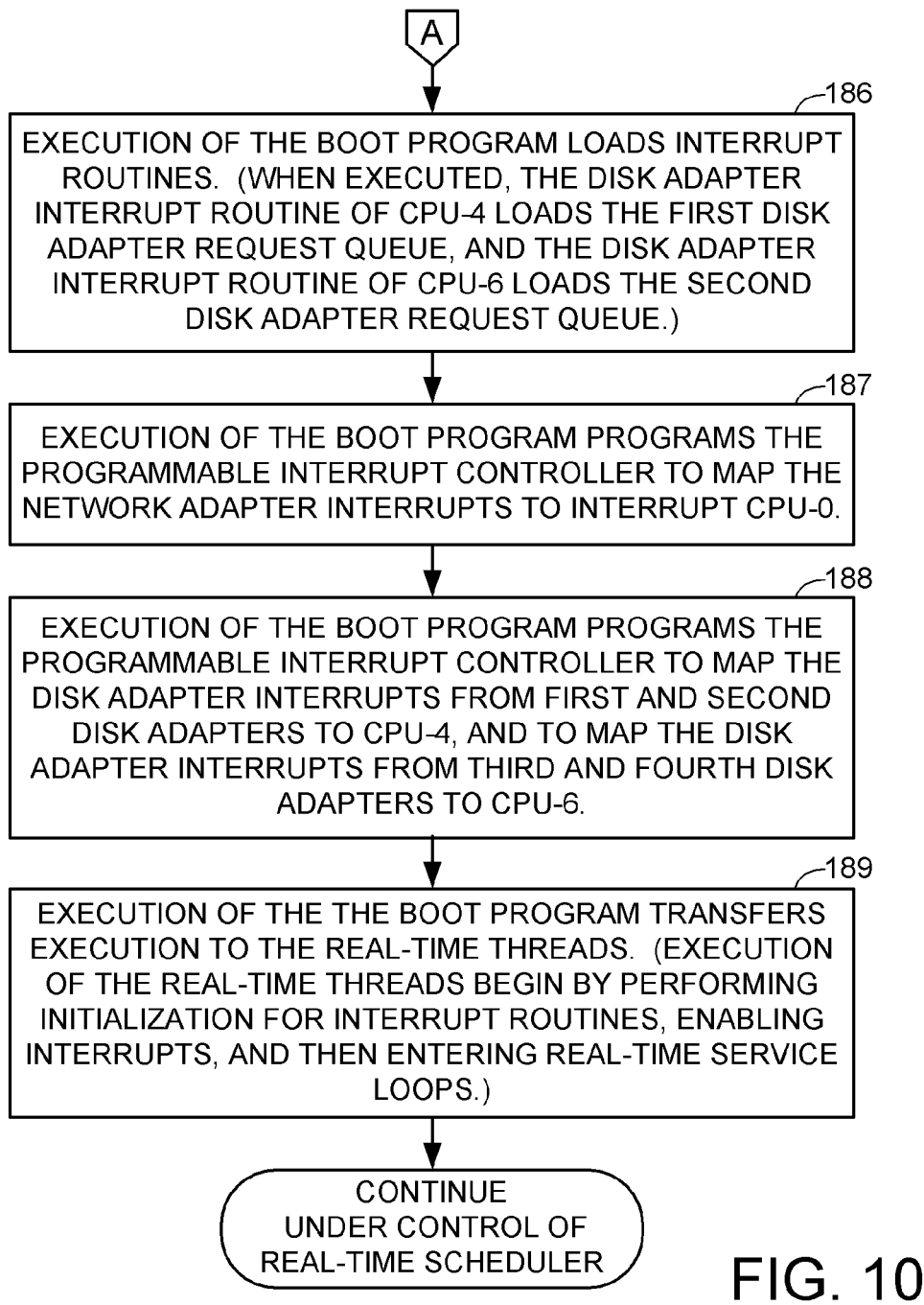

FIGS. 9 and 10 together show the loading of the code threads of FIG. 8 into the shared memory of the network file server in response to a system reset. In step 181, CPU-0 begins execution of a firmware loader routine. In step 182, execution of the firmware loader loads a boot program from the disk storage to the shared memory, and then transfers execution to the boot program in shared memory. In step 183, execution of the boot program loads the real-time scheduler, thread manager, queue loader, queue service routine, and real-time threads from disk storage to the shared memory. The real-time thread of CPU 0, the real-time thread of CPU 2, the real-time thread of CPU 5, and the real-time thread of CPU 7 each include a series of instructions (RT-NET) for network stack processing.

In step 184, execution of the boot program loads the hard affinity queue of each processor with one SCSI/FC thread. When executed, for the example shown in FIG. 8, the SCSI/

FC threads in the hard affinity queues of CPU 0, CPU 4, CPU 1, and CPU 5 service a first disk adapter request queue, and the SCSI/FC threads in the hard affinity queues of CPU 2, CPU 6, CPU 3, and CPU 7 service a second disk adapter request queue. In step 185, execution of the boot program loads the soft affinity queue of each processor with at least one file system processing thread. Execution continues from step 185 to step 186 in FIG. 10.

In step 186 of FIG. 10, execution of the boot program loads the interrupt routines. When executed, for the example shown in FIG. 8, the disk adapter interrupt routine of CPU 4 loads the first disk adapter request queue, and the disk adapter interrupt routine of CPU 6 loads the second disk adapter request queue. In step 187, execution of the boot program programs the programmable interrupt controller to map the network adapter interrupts to interrupt CPU 0. In step 188, for the example shown in FIG. 8, execution of the boot program programs the programmable interrupt controller to map the disk adapter interrupts from the first and second disk adapters to CPU 4, and to map the disk adapter interrupts from the third and fourth disk adapters to CPU 6. In step 189, execution of the boot program transfers execution to the real-time threads. Execution of the real-time threads begin by performing initialization for interrupt routines, enabling interrupts, and then entering real-time service loops. After step 189, execution continues under control of the real-time scheduler, because the interrupts enabled in step 189 include the "timer tic" interrupt which drives the real-time scheduler.

In view of the above, there has been described a way of assigning interrupts and code threads to the core CPUs of network file server having a multi-core processor in order to improve performance and in particular reduce latency for processing client requests for file access. Threads of the network stack are incorporated into the real time threads that are scheduled by the real-time scheduler and executed exclusively by a plurality of the core CPUs that are not interrupted by the disk adapter interrupts so that the disk adapter interrupts do not interrupt execution of the network stack. Instances of the storage access driver are hard affinity threads, and the soft affinity threads include a multitude of instances of a thread of the file system stack for file access request processing so that file access request processing for a multitude of concurrent file access requests is load balanced over the core CPUs.

What is claimed is:

1. A network file server comprising:
    a data processor;
    a disk storage array storing data;
    network adapters for linking the data processor to a data network for exchange of data packets between the data processor and clients in the data network; and
    storage adapters linking the data processor to the disk storage array for exchange of data blocks between the data processor and the disk storage array;
    wherein the data processor includes at least eight core central processing units (CPUs), and shared memory shared among the core CPUs and containing programs executable by the core CPUs;
    wherein the programs executable by the core CPUs include a real-time scheduler for scheduling execution of real-time and general purpose threads, and a thread manager for managing execution of hard affinity threads and soft affinity threads of the general purpose threads, each of the hard affinity threads being executed exclusively by a respective one of the core CPUs, and the thread manager distributing execution of the soft affinity threads among the core CPUs for load balancing;
    wherein the programs executable by the core CPUs further include:
    a network adapter interrupt routine for responding to interrupts from the network adapters when the network adapters receive data packets from the data network;
    a network stack for transmission of data through the network adapters between the data processor and the data network in accordance with a network data transmission protocol;
    a file system stack for providing clients in the data network with access to the data storage array in accordance with a file system access protocol and for maintaining an in-core file system cache in the shared memory;
    a storage access driver for accessing the data storage array in accordance with a storage access protocol; and
    a disk adapter interrupt routine for responding to interrupts from the disk adapters when the disk adapters receive data blocks from the disk storage array;
    wherein threads of the network stack are incorporated into the real time threads that are scheduled by the real-time scheduler and executed exclusively by a plurality of the core CPUs that are not interrupted by the disk adapter interrupts so that the disk adapter interrupts do not interrupt execution of the network stack; and
    wherein instances of the storage access driver are hard affinity threads; and
    wherein the soft affinity threads include a multitude of instances of a thread of the file system stack for file access request processing so that file access request processing for a multitude of concurrent file access requests is load balanced over the core CPUs.

2. The network file server as claimed in claim 1, wherein all of the network adapter interrupts are mapped to a single one of the core CPUs so that the single one of the core CPUs is interrupted by each of the network adapter interrupts to execute the network adapter interrupt routine, and the single one of the core CPUs is not interrupted by any of the disk adapter interrupts.

3. The network file server as claimed in claim 2, wherein the single one of the core CPUs executes one of the real time threads into which is incorporated at least one thread of the network stack.

4. The network file server as claimed in claim 1, wherein pairs of the core CPUs share respective level-two (L2) cache memories, and each core CPU that executes one of the real-time threads into which is incorporated at least one thread of the network stack shares a respective one of the level-two (L2) cache memories with another one of the core CPUs that executes one of the real time threads into which is incorporated at least one thread of the network stack.

5. The network file server as claimed in claim 4, wherein four of the core CPUs execute respective real-time threads, and at least one thread of the network stack is incorporated into each of the respective real-time threads of said four of the core CPUs.

6. The network file server as claimed in claim 1, wherein each of the core CPUs executes one hard affinity thread instance of the disk adapter driver.

7. The network file server as claimed in claim 1, wherein each core CPU that is interrupted by disk adapter interrupts maintains a respective disk adapter request queue for said each core CPU by placing a disk adapter request on the disk adapter request queue for said each core CPU when said each core CPU executes the disk adapter interrupt routine in response to a disk adapter interrupt, and said each core CPU also executes a respective hard affinity thread that is an instance of the storage access driver in order to service disk adapter requests on the disk adapter request queue for said each core CPU.

8. The network file server as claimed in claim 7, wherein pairs of the core CPUs share respective level-two (L2) cache memories, and each core CPU that is interrupted by disk adapter interrupts shares a respective one of the level-two (L2) cache memories with another one of the core CPUs that is also interrupted by disk adapter interrupts.

9. The network file server as claimed in claim 8, wherein two of the core CPUs sharing a respective one of the level-two (L2) cache memories are interrupted by disk adapter interrupts by mapping interrupts of a first one and a second one of the disk adapters to a first one of the two of the core CPUs sharing a respective one of the level-two (L2) cache memories, and by mapping interrupts of a third one and a fourth one of the disk adapters to a second one of the two of the core CPUs sharing a respective one of the level-two (L2) cache memories.

10. The network file server as claimed in claim 8, wherein two pairs of the core CPUs sharing respective ones of the level-two (L2) cache memories are interrupted by disk adapter interrupts of each disk adapter to a respective one of the core CPUs in the two pairs of CPUs sharing respective ones of the level-two (L2) cache memories.

11. A network file server comprising:
a data processor;
a disk storage array storing data;
network adapters linking the data processor to a data network for exchange of data packets between the data processor and clients in the data network; and
storage adapters linking the data processor to the disk storage array for exchange of data blocks between the data processor and the disk storage array;
wherein the data processor includes at least eight core central processing units (CPUs), and shared memory shared among the core CPUs and containing programs executed by the core CPUs;
wherein the programs executable by the core CPUs include a real-time scheduler scheduling execution of real-time and general purpose threads, and a thread manager managing execution of hard affinity threads and soft affinity threads of the general purpose threads, each of the hard affinity threads being executed exclusively by a respective one of the core CPUs, and the thread manager distributing execution of the soft affinity threads among the core CPUs for load balancing;
wherein the programs executed by the core CPUs further include:
a network adapter interrupt routine responding to interrupts from the network adapters when the network adapters receive data packets from the data network;
a network stack transmitting data through the network adapters between the data processor and the data network in accordance with a network data transmission protocol;
a file system stack providing clients in the data network with access to the data storage array in accordance with a file system access protocol and maintaining an in-core file system cache in the shared memory;
a storage access driver accessing the data storage array in accordance with a storage access protocol; and
a disk adapter interrupt routine responding to interrupts from the disk adapters when the disk adapters receive data blocks from the disk storage array;
wherein threads of the network stack are incorporated into the real time threads that are scheduled by the real-time scheduler and executed exclusively by a plurality of the core CPUs that are not interrupted by the disk adapter interrupts so that the disk adapter interrupts do not interrupt execution of the network stack; and
wherein instances of the storage access driver are hard affinity threads; and
wherein the soft affinity threads include a multitude of instances of a thread of the file system stack for file access request processing so that file access request processing for a multitude of concurrent file access requests is load balanced over the core CPUs;
wherein all of the network adapter interrupts are mapped to a single one of the core CPUs so that the single one of the core CPUs is interrupted by each of the network adapter interrupts to execute the network adapter interrupt routine, and the single one of the core CPUs is not interrupted by any of the disk adapter interrupts;
wherein four of the core CPUs execute respective real-time threads, and at least one thread of the network stack is incorporated into each of the respective real-time threads of said four of the core CPUs, and the single one of the core CPUs executes one of the real time threads into which is incorporated at least one thread of the network stack; and
wherein each of the core CPUs executes one hard affinity thread instance of the disk adapter driver.

12. The network file server as claimed in claim 11, wherein pairs of the core CPUs share respective level-two (L2) cache memories, and each core CPU that executes one of the real-time threads into which is incorporated at least one thread of the network stack shares a respective one of the level-two (L2) cache memories with another one of the core CPUs that executes one of the real time threads into which is incorporated at least one thread of the network stack.

13. The network file server as claimed in claim 11, wherein each core CPU that is interrupted by disk adapter interrupts maintains a respective disk adapter request queue for said each core CPU by placing a disk adapter request on the disk adapter request queue for said each core CPU when said each core CPU executes the disk adapter interrupt routine in response to a disk adapter interrupt, and said each core CPU also executes a respective hard affinity thread that is an instance of the storage access driver in order to service disk adapter requests on the disk adapter request queue for said each core CPU, and pairs of the core CPUs share respective level-two (L2) cache memories, and each core CPU that is interrupted by disk adapter interrupts shares a respective one of the level-two (L2) cache memories with another one of the core CPUs that is also interrupted by disk adapter interrupts.

14. The network file server as claimed in claim 13, wherein two of the core CPUs sharing a respective one of the level-two (L2) cache memories are interrupted by disk adapter interrupts by mapping interrupts of a first one and a second one of the disk adapters to a first one of the two of the core CPUs sharing a respective one of the level-two (L2) cache memories, and by mapping interrupts of a third one and a fourth one of the disk adapters to a second one of the two of the core CPUs sharing a respective one of the level-two (L2) cache memories.

15. The network file server as claimed in claim 13, wherein two pairs of the core CPUs sharing respective ones of the level-two (L2) cache memories are interrupted by disk adapter interrupts of each disk adapter to a respective one of the core CPUs in the two pairs of CPUs sharing respective ones of the level-two (L2) cache memories.

16. A network file server comprising:
a data processor;

a disk storage array storing data;

network adapters linking the data processor to a data network for exchange of data packets between the data processor and clients in the data network in the data network; and storage adapters linking the data processor to the disk storage array for exchange of data blocks between the data processor and the disk storage array;

wherein the data processor includes at least eight core central processing units (CPUs), and shared memory shared among the core CPUs and containing programs executed by the core CPUs;

wherein the programs executable by the core CPUs include a real-time scheduler scheduling execution of real-time and general purpose threads, and a thread manager managing execution of hard affinity threads and soft affinity threads of the general purpose threads, each of the hard affinity threads being executed exclusively by a respective one of the core CPUs, and the thread manager distributing execution of the soft affinity threads among the core CPUs for load balancing;

wherein the programs executed by the core CPUs further include:

a network adapter interrupt routine responding to interrupts from the network adapters when the network adapters receive data packets from the data network;

a network stack transmitting data through the network adapters between the data processor and the data network in accordance with a network data transmission protocol;

a file system stack providing clients in the data network with access to the data storage array in accordance with a file system access protocol and maintaining an in-core file system cache in the shared memory;

a storage access driver accessing the data storage array in accordance with a storage access protocol; and a disk adapter interrupt routine responding to interrupts from the disk adapters when the disk adapters receive data blocks from the disk storage array;

wherein threads of the network stack are incorporated into the real time threads that are scheduled by the real-time scheduler and executed exclusively by a plurality of the core CPUs that are not interrupted by the disk adapter interrupts so that the disk adapter interrupts do not interrupt execution of the network stack; and wherein instances of the storage access driver are hard affinity threads; and wherein the soft affinity threads include a multitude of instances of a thread of the file system stack for file access request processing so that file access request processing for a multitude of concurrent file access requests is load balanced over the core CPUs;

wherein four of the core CPUs execute respective real-time threads, and at least one thread of the network stack is incorporated into each of the respective real-time threads of said four of the core CPUs;

wherein pairs of the core CPUs share respective level-two (L2) cache memories, and each core CPU that executes one of the real-time threads into which is incorporated at least one thread of the network stack shares a respective one of the level-two (L2) cache memories with another one of the core CPUs that executes one of the real time threads into which is incorporated at least one thread of the network stack; and wherein each of the core CPUs executes one hard affinity thread instance of the disk adapter driver.

17. The network file server as claimed in claim 16, wherein all of the network adapter interrupts are mapped to a single one of the core CPUs so that the single one of the core CPUs is interrupted by each of the network adapter interrupts to execute the network adapter interrupt routine, the single one of the core CPUs is not interrupted by any of the disk adapter interrupts, and the single one of the core CPUs executes one of the real time threads into which is incorporated at least one thread of the network stack.

18. The network file server as claimed in claim 16, wherein each core CPU that is interrupted by disk adapter interrupts maintains a respective disk adapter request queue for said each core CPU by placing a disk adapter request on the disk adapter request queue for said each core CPU when said each core CPU executes the disk adapter interrupt routine in response to a disk adapter interrupt, and said each core CPU also executes a respective hard affinity thread that is an instance of the storage access driver in order to service disk adapter requests on the disk adapter request queue for said each core CPU, and each core CPU that is interrupted by disk adapter interrupts shares a respective one of the level-two (L2) cache memories with another one of the core CPUs that is also interrupted by disk adapter interrupts.

19. The network file server as claimed in claim 18, wherein two of the core CPUs sharing a respective one of the level-two (L2) cache memories are interrupted by disk adapter interrupts by mapping interrupts of a first one and a second one of the disk adapters to a first one of the two of the core CPUs sharing a respective one of the level-two (L2) cache memories, and by mapping interrupts of a third one and a fourth one of the disk adapters to a second one of the two of the core CPUs sharing a respective one of the level-two (L2) cache memories.

20. The network file server as claimed in claim 18, wherein two pairs of the core CPUs sharing respective ones of the level-two (L2) cache memories are interrupted by disk adapter interrupts of each disk adapter to a respective one of the core CPUs in the two pairs of CPUs sharing respective ones of the level-two (L2) cache memories.

* * * * *